(12) United States Patent
Kennedy

(10) Patent No.: US 9,399,434 B2
(45) Date of Patent: Jul. 26, 2016

(54) FENCING REPAIR AND CARGO TOOLBOX

(76) Inventor: Jerry Kennedy, Rock River, WY (US)

( * ) Notice: Subject to any disclaimer, the term of this patent is extended or adjusted under 35 U.S.C. 154(b) by 202 days.

(21) Appl. No.: 13/289,357

(22) Filed: Nov. 4, 2011

(65) Prior Publication Data

US 2012/0217276 A1    Aug. 30, 2012

Related U.S. Application Data

(60) Provisional application No. 61/446,134, filed on Feb. 24, 2011.

(51) Int. Cl.
*B60R 9/06* (2006.01)
*B60R 11/06* (2006.01)
*B25H 3/02* (2006.01)
*B60R 11/00* (2006.01)

(52) U.S. Cl.
CPC ........... *B60R 11/06* (2013.01); *B25H 3/022* (2013.01); *B60R 2011/004* (2013.01); *B60R 2011/0059* (2013.01)

(58) Field of Classification Search
USPC ......... 224/400, 401, 404, 405, 488, 533, 534, 224/536, 537; D12/107, 407; 206/373, 372, 206/349; 296/37.6
See application file for complete search history.

(56) References Cited

U.S. PATENT DOCUMENTS

| | | | |
|---|---|---|---|
| 1,933,894 A * | 11/1933 | Clink | 220/259.2 |
| 4,830,247 A * | 5/1989 | Banks | 224/666 |
| 5,484,092 A * | 1/1996 | Cheney | 224/404 |
| 5,573,162 A | 11/1996 | Spencer | |
| 5,913,380 A * | 6/1999 | Gugel et al. | 182/129 |
| 6,070,732 A | 6/2000 | Chen | |
| 6,202,865 B1 * | 3/2001 | Kuo | 211/70.6 |
| 6,386,409 B1 * | 5/2002 | Cheney | 224/404 |
| 7,128,341 B1 | 10/2006 | Dahl et al. | |
| 7,275,641 B1 | 10/2007 | Purnell | |
| 8,196,988 B1 * | 6/2012 | Malleck | 296/37.6 |
| 2004/0182899 A1 * | 9/2004 | Deutchman | 224/410 |
| 2004/0217028 A1 * | 11/2004 | Ploumitsakos | 206/349 |
| 2007/0181623 A1 * | 8/2007 | Schneider | 224/401 |
| 2007/0194543 A1 * | 8/2007 | Duvigneau | 280/47.26 |

* cited by examiner

*Primary Examiner* — J. Gregory Pickett
*Assistant Examiner* — Todd Anderson
(74) *Attorney, Agent, or Firm* — Daniel Boudwin; Global Intellectual Property Agency

(57) ABSTRACT

A cargo toolbox is provided for securely retaining tools and equipment of varying size and shape, particularly suited for attachment to a vehicle and for use repairing fence lines. The toolbox comprises a lid hingedly secured to a base, a handle and latches for removably securing the lid to the base. A plurality of securement structures is disposed along the interior of the lid and base for storing and restricting movement of tools and components. Elongated tools may be stored within brackets disposed along the lid interior. Small items are separately retained within secure storage compartments disposed along an end of the base interior. A compartment lid is hingedly secured to the storage compartments such that items are prevented from departing. A restraining tray defining an upstanding wall perimeter and an open interior is mountable to a vehicle cargo rack to facilitate transportation of the toolbox.

16 Claims, 2 Drawing Sheets

FENCING REPAIR AND CARGO TOOLBOX

CROSS REFERENCE TO RELATED APPLICATION

This application claims the benefit of U.S. Provisional Application No. 61/446,134 filed on Feb. 24, 2011 entitled "Fencing Box."

BACKGROUND OF THE INVENTION

1. Field of the Invention

The present invention relates to a cargo toolbox. More specifically, the present invention relates to a toolbox for retaining fence repair tools that is securable to a moving vehicle.

Farm workers, ranchers and other outdoor workers sometimes find they need to perform repair tasks in locations that are inaccessible by road. Jobs such as fence repair, trough mending and large equipment maintenance may require specialized tools or an abundance of components. These items may be placed in a toolbox or otherwise carried by hand to the repair site; however the weight of the components or the length of the walk may make this exercise less feasible. If multiple repairs must be commenced, then the worker has to carry the equipment from one site to the next. The strain of hauling heavy or substantial amounts of equipment may result fatigue or injury to workers.

To reduce the risk of injury and increase the speed of repair completion, workers often use all-terrain vehicles for transporting tools and equipment to and from repair sites in remote locations. All-terrain vehicles (ATVs) are able to cover hilly, rocky and otherwise uneven terrain that automobiles cannot easily traverse. These vehicles are commonly equipped with front and rear cargo racks that permit equipment to be secured thereto. Workers strap toolboxes and miscellaneous equipment to the cargo rack of an ATV and then ride to a repair site, thus eliminating the need for them to carry heavy items over a distance. During the course of transit, items carried by ATV are heavily jostled and items within an attached storage container may experience significant shifting. This is problematic if the toolbox contains small items that could become mixed up, rope that can become entangled or tools with pointed heads that could damage other items in the box. A storage container is needed that can securely retain a variety of tools and related items while the toolbox is in transit over rough terrain.

2. Description of the Prior Art

The prior art contains a variety of cargo toolboxes mounted to all-terrain vehicles for providing a secure carrying container for tools and cargo. These devices have familiar design and structural elements for the purposes of securely retaining cargo while an all-terrain vehicle is in motion; however they are not adapted for the task of securely retaining small or delicate items that may be needed for specialized repair work.

Dahl et al, U.S. Pat. No. 7,128,341 discloses a storage box associated with an all-terrain vehicle. The box comprises an accessory box base and a lid. This lid is hingedly secured along an edge to the accessory box base and fits over the same. The lid also functions as a cargo rack that items may be placed upon. Lanyards may be used to removably secure the lid in a closed position on the accessory box base. Drain holes may be disposed in the box to allow moisture accumulation to seep out of the box. The device is mounted to the front of an all-terrain vehicle. Dean does not disclose a compartment within the box or an internal compartment having a removably securable lid. Dean also does not disclose the use of latches to secure the toolbox lid to the base.

Spencer et al, U.S. Pat. No. 5,573,162 discloses a toolbox mounted to an all-terrain vehicle. The toolbox comprises a container base, a lid, and a plurality of compartments housed within the container. The container has a "U" shape as viewed from overhead. The interior of the container base is separated into three compartments by interior walls. The container lid is hingedly secured to the container base. Latches are secured to the front of the container along the lid and base, to removably secure the former to the later. A railing is disposed around front and side edges of the container lid to prevent items placed on the toolbox from sliding off. On a bottom surface of the container base, four elastic straps are secured for the purposes of effecting securement to the utility rack of an all-terrain vehicle. The toolbox of Spencer does not disclose a removably secured lid covering interior compartments of the toolbox.

The prior art also contains general-purpose cargo storage containers. The design and structure of these devices are suited for retaining a variety of objects. However, they are not adapted to provide securement of objects within the container while the container is being transported in a moving vehicle.

Purnell, U.S. Pat. No. 7,275,641 discloses a hand-tool organizer comprising a container and a supporting board hingedly connected thereto. The support board has a plurality of apertures of varying size and geometric shape, disposed along the length of the support board. The working ends of tools may be placed on the support board so that their handles hang down into the container. Tools are thereby kept from sliding around within the container and are easily accessible to a worker. The support board is removably secured to the container base. The bottom of the container base is also removably securable to the same, to allow a user access to the tools or items placed in the box. Purnell does not disclose internal compartments for securing small objects. Unlike the present invention, Purnell does not contemplate a means for removably securing the device to a moving vehicle.

Chen, U.S. Pat. No. 6,070,732 discloses a storage box for securely retaining small tool components. The device comprises a base, a lid hingedly secured thereto, and a plurality of storage compartments disposed within said base. Tool retention bars are pivotally secured within the storage compartments. The tool retention bars have recesses disposed along the length of the bar adapted to receive and retain tool components such as drill bits and screwdriver heads. Once tool components are placed in the retention bar, the bar may be folded down into the compartment to the items. The lid of the container may then be closed and removably secure to the base by means of snapping latches. There is insufficient interior space for retaining large tools. Chen also does not disclose an interior lid portion for preventing small items from moving out of a storage compartment, when the device is in transit. Chen also does not disclose a means for removably securing the toolbox to a vehicle.

The devices disclosed by the prior art do not address the need for securement of objects of varying size within a toolbox, and in particular, securing tools utilized for repairing fences. The current invention relates to a device for securing a variety of components within a toolbox, including fence repair tools and other assorted repair hand tools. It substantially diverges in structural elements from the prior art; consequently it is clear that there is a need in the art for an improvement to the known types of cargo toolboxes. In this regard the instant invention substantially fulfills these needs.

SUMMARY OF THE INVENTION

In view of the foregoing disadvantages inherent in the known types of cargo toolboxes now present in the prior art, the present invention provides a new means for securely retaining objects of varying size wherein the same can be utilized for providing convenience for the user when carrying hand tools and cargo on a moving vehicle. The device comprises a base, a lid, a handle and securing means. The lid is hingedly secured to the base and additionally has folding hinge brackets secured at the sides of the lid and base members to prevent overextension of the hinged securement means. A pair of latches disposed along the front walls of the toolbox removably secures the lid to the base.

The toolbox has a plurality of securement structures disposed within the lid and base. Brackets are positioned along the interior of the lid for the purposes of retaining elongated tools such as fence stretchers. Box-shaped pockets are disposed along the interior of the lid and base to allow small to medium sized tools and items to be stored. The second box-shaped pocket may be used for retaining the heads of oddly shaped tools. Placement of tool heads within the pocket reduces the risk that they will collide with other items in the toolbox and cause damage thereto. A securing strap made of a flexible material is secured to the interior to secure the handles of larger tools therebeneath, reducing movement or sliding of tools. For storage of smaller items, a plurality of securable storage compartments is disposed at one end of the base interior. A compartment lid covers the storage compartments to prevent items placed within from shifting or becoming dislodged.

The different types and placement of the securing structures provide a user the ability to store components having a variety of shapes and sizes. It is convenient for farmers, ranchers and other workers who may need to perform repair tasks in an area without vehicle access or easy accessibility to a larger toolbox. The present invention may be secured to an all-terrain vehicle by means of an upstanding restraining tray secured to the cargo rack of the ATV. The restraining tray is a rectangularly shaped barrier with upstanding perimeter walls and an open interior, adapted to receive the cargo toolbox within its interior. A user may place the toolbox within the restraining tray to reduce the likelihood that the toolbox will fall or dislodge from the cargo rack. In this manner, a user may transport tools and components to locations that are not easily accessible by a standard vehicle, without the components shifting or sliding within the toolbox.

It is therefore an object of the present invention to provide a new and improved cargo toolbox having all of the advantages of the prior art and none of the disadvantages.

Still another object of the present invention is to provide a new and improved cargo toolbox having a compartment lid covering a plurality of secure storage compartments to prevent items from departing the storage compartments during transit of the device.

Yet another object of the present invention is to provide a new and improved cargo toolbox having a variety of securement structures for restricting the movement of items stored within the toolbox Another object of the present invention is to provide a new and improved cargo toolbox having a plurality of secure storage compartments for the separated storage of small components.

Another object of the present invention is to provide an improved cargo toolbox that can be specifically adapted to hold fence repair and fence construction equipment.

A further object of the present invention is to provide a new and improved cargo toolbox having resilient and durable construction.

Other objects, features and advantages of the present invention will become apparent from the following detailed description taken in conjunction with the accompanying drawings.

BRIEF DESCRIPTIONS OF THE DRAWINGS

The above invention will be better understood and the objects set forth above as well as other objects not stated above will become more apparent after a study of the following detailed description thereof. Such description makes use of the annexed drawings wherein like numeral references are utilized throughout.

DETAILED DESCRIPTION OF THE INVENTION

Figure 1:
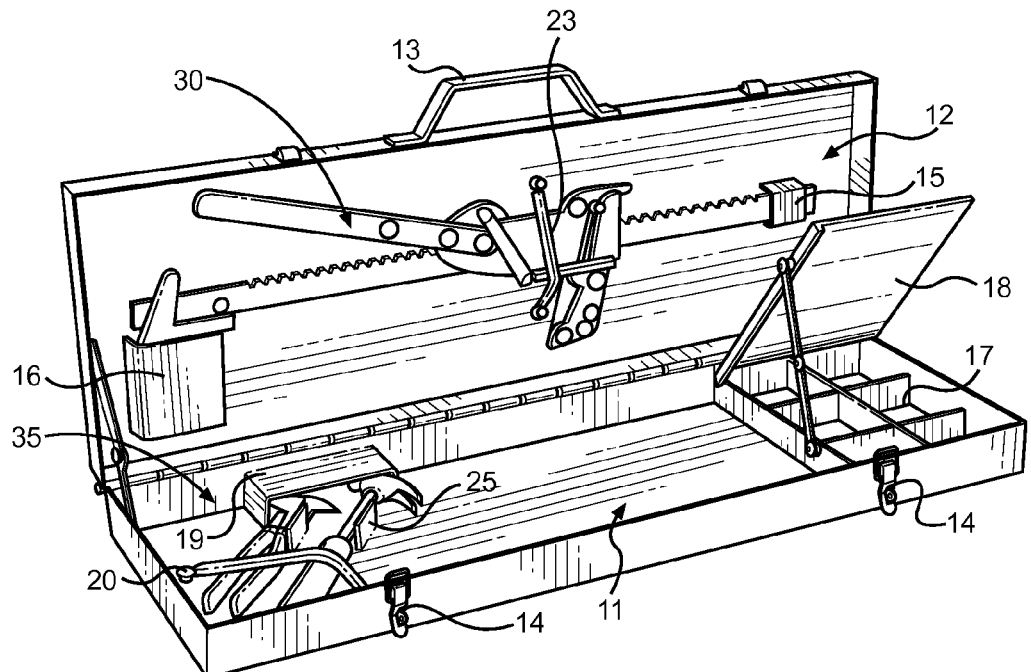
FIG. 1 shows a perspective view of the present cargo toolbox device while in use for the storage of fencing tools.

Reference is made herein to the attached drawings. Like reference numerals are used throughout the drawings to depict like or similar elements of the cargo toolbox device. For the purposes of presenting a brief and clear description of the present invention, the preferred embodiment will be discussed as used for assisting a user with securely retaining cargo and hand tools. This is for representative purposes only and should not be considered to be limiting in any respect.

Referring now to FIG. 1 there is shown a cargo toolbox according to the present invention as used for holding fencing tools. The cargo toolbox comprises a base member 11, a lid member 12, a handle 13 and a closure securing means 14. The base member of the toolbox has four upstanding walls and a bottom surface defining an interior space. The lid member has four walls and an upper surface defining another interior space. The walls of the lid member are oversized to overlap the base upstanding walls when the lid is lowered thereonto, preventing water from entering the box when the lid and base compartments are secured together. Within the base and lid members, a plurality of structures is disposed for facilitating the retention of various hand tools. A bracket 15 and box-shaped pocket 16 are disposed along opposing sides of the lid 12 surface, which are adapted to receive a fence stretcher or other elongated tool. The box-shaped pocket has three walls and an upper portion, which define an interior pocket volume for supporting the fence stretcher tool, while the bracket comprises a U-shaped cross-section for fitting an opposing end of the stretcher tool therethrough, securing the tool in placed against the lid 12. A first securing strap 23 is also provided to further secure the tool placed into the pocket and bracket, preventing movement thereof while in transport. The strap 23 is secured along its two terminal ends to the upper portion, or is alternatively removably secured along one terminal end to wrap around a positioned fence stretcher tool. In another alternative, a plurality of brackets may be provided for securing various elongated structures, not specifically a fence stretcher tool.

The bracket 15, pocket 16, and strap 23 are utilized together as a single securing member 30 on the lid 12, whereby the combination is adapted to support larger tools having a handled end and a working end, such as fence stretchers. Furthermore, the three tool supporting elements are located on the lid 12 in order to provide more storage space on the base 11 interior. In use, the working end of the tool can be placed into the pocket 16, whereby the pocket 16 can be made of a solid material that is capable of retaining its structural integrity when contacted by hard or sharp tool working ends. The handle or midsection of the tool is adapted to project across the lid 12. Thereafter, the user can place a distal end of the elongate tool within bracket 15, which secures the tool within the upper lid 12. Finally, the user can secure the strap 23 around the midsection of the tool in order to provide increased support and to restrict movements within the toolbox.

Items needing securement, such as fasteners, drill bits and tool heads may be placed within one of the secure storage compartments 17. The secure storage compartments are disposed at a first end of the base 11 member interior. A compartment lid 18 lowers over the compartments to prevent items in the compartments from dislodging from their compartment while the toolbox is in transit. Also disposed within the base member is a second, box-shaped pocket 19 that is adapted to receive the working ends of tools such as hammers and pliers that may have oddly shaped or sharp heads. If left unrestrained, these tools could slide around the toolbox, colliding with other items that may be damaged by the working end of the tool. To further reduce the sliding of such tools, upstanding guide protrusions may be disposed near the second pocket to provide support to the handles of tools retained therewithin. Also provided is a flexible securing strap 20 that may be positioned over handles of tools retained within the pocket 19. This strap 20 is secured at one end to the interior surface of a base member lower surface, while the opposing end of the strap is removably attachable to a support location and may be lifted and lowered by a user to permit positioning of tool handles. The strap 20 may alternatively be permanently secure on both of its terminal ends, which requires the strap to be lifted over the handles of tools after they are positioned in the pocket 19. The securing strap 20 may be constructed of any flexible, durable material such as plastic or rubber.

The base member interior also includes a pair of parallel walls 25 that work in conjunction with the strap 20 and pocket 19, whereby the combination are utilized for providing a single securing member 35 that is located on the base 11 of the toolbox. The base securing mechanism 35 is designed to maintain separation between long tools having a working end and a handled end, such as hammers and pliers. Additionally, the parallel walls 25 and pocket 19 of the securing member 35 can be solid in design, thereby enabling the pocket 19 and walls 25 to maintain form when separating or supporting tools therein. In use, a user may place the working end of a tool into the solid pocket 19, whereby the handle of the working end projects outward from the pocket 19. The user then may align the handle along one of the two parallel walls 25 in order to provide a separation between the two tools. Thereafter, the user may lift or otherwise secure the securing strap 20 over the distal end of the handle of the tool.

Figure 2:
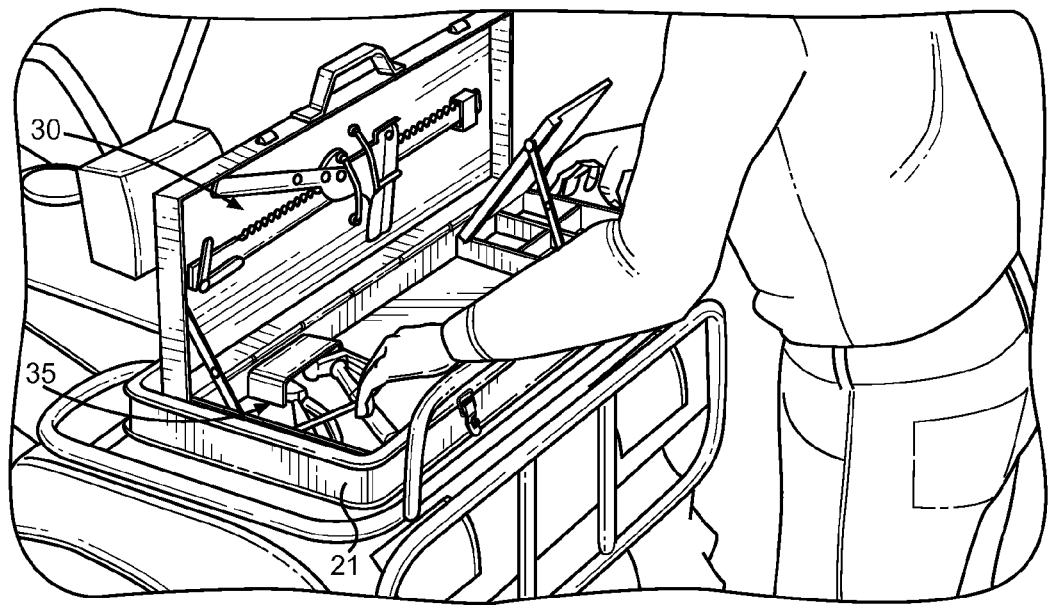
FIG. 2 shows a perspective view of the present cargo toolbox device mounted to the back of an all-terrain vehicle and within the restraining tray.

Referring now to FIG. 2, there is shown a perspective view of a user removing items from the toolbox, which is mounted to an all-terrain vehicle. A rectangular restraining tray 21 is removably mounted to the cargo rack of the all-terrain vehicle cargo rack. The restraining tray comprises upstanding perimeter walls defining an interior space that is sized to accommodate the cargo toolbox of the present invention. A user may place the toolbox within the interior space of the restraining tray to reduce the ability of the toolbox to slide from the cargo rack. To further secure the cargo toolbox, a user may secure elastic cords or rope over the top surface of the toolbox. In this manner the toolbox may be transported across rough terrain without being thrown off the cargo rack. Once a destination has been reached, the user may choose to leave the toolbox within the restraining tray, or remove the toolbox. Access to the interior of the toolbox is not restricted in any way by the placement of the toolbox within the restraining tray.

Figure 3:
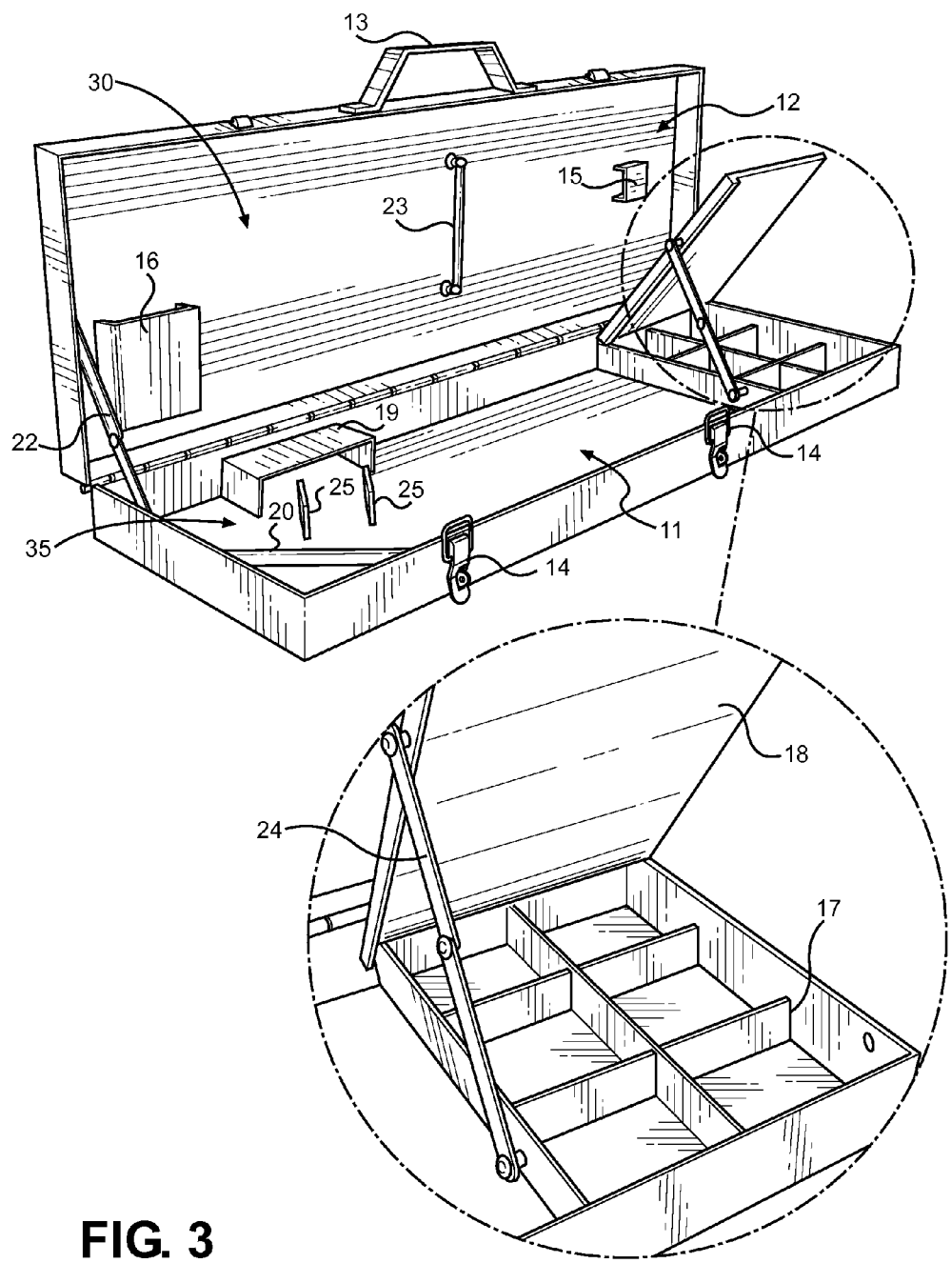
FIG. 3 shows a perspective view of the present cargo toolbox device and a magnified view of the internal storage compartments.

Referring now to FIG. 3, there is shown a perspective view of the cargo toolbox device. The lid 12 member is hingedly secured along a rear wall of the base 11 member. Along front walls of the lid and base members are secured a pair of closure securing means 14. The securing means comprises a pair of draw latches wherein either a male or female portion of the latch is secured to the front wall of the lid, and the corresponding latch portion is mounted to the front wall of the base. The male and female portions are positioned such that they engage to form removable securement of the lid to the base. Folding brackets 22 may be secured to the interior sides of the lid and base members to prevent a user from opening the container beyond a desired angle. A handle 13 is secured along the exterior of the lid front wall. The handle may have a "D" shape or any other shape that provides convenience for a user when carrying the toolbox by hand.

A magnified view is shown of the secure storage compartments 17 and the associated compartment lid 18. The secure storage compartments are positioned at an end of the interior volume provided by the base member 11. The storage compartments comprise a matrix of inner containers having four upstanding walls and compartment lid 18 adapted to fit over the entire matrix of containers, secured via a folding hinge bracket 24. Three of the walls of the base member provide a boundary for the compartment, while interior divider walls within the compartment separate the interior into containers for secure storage of articles in an organized fashion. Small items such as fasteners, tool heads and drill bits may be placed within the compartment to prevent shifting while in transit. When the compartment lid 18 is closed, items placed within the secure storage containers are prevented from moving from one container to another. This keeps items of a similar shape and size segregated such that a user does not need to perform measurements or visual comparisons between items when selecting items for use. In an alternative embodiment, the inner container is not integrated into the base member, such that the compartment and matrix of containers may be slid within the interior of the base member 11 or removed therefrom according to a user's storage needs.

In use an individual opens the toolbox and inserts tools he or she needs to transport. Elongated tools may be inserted into the bracket and pocket, or plurality of brackets positioned within the lid member. Items such as small wrenches, measuring tape, or pliers may be placed in the first box-shaped pocket to hold them in place. Larger tools, having handles or oddly shaped working ends that might damage other items may be placed within the second box-shaped pocket positioned within the base member. A user may then secure the handles of these tools by lifting the securing strap and positioning the ends of tool handles beneath the strap. The secure storage compartments may be filled with fasteners or small items that require separation from other like items. Empty space within the toolbox may be filled with miscellaneous components such as wire, rope, or other tools. The user may then place the toolbox within the interior space of the restraining tray and removably secure the toolbox to the cargo rack of an all-terrain vehicle by tying it down with rope or other securing means. The toolbox may also be utilized without the restraining tray if desired. Alternatively, a plurality of fasteners may be utilized to removably secure the toolbox directly to a vehicle cargo rack, providing improved and longer term attachment.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim the following:

1. A vehicle-mounted cargo toolbox, comprising:
a base member having four upstanding walls and a bottom surface, defining a base interior space;
a lid member having four walls and a top surface, defining a lid interior space, and said lid being hingedly secured to said base;
a handle disposed along an exterior wall of said lid member, opposite said hinge;
a closure securing means attached along an exterior wall of said lid and said base members, opposite said hinge, removably securing said lid to said base;
said base having a securing member thereon, said base securing member comprising a pocket secured to said base wherein said pocket comprises one or more side walls, a closed bottom, and an open top, defining an interior volume adapted to retain a working end of a tool, a pair of parallel walls disposed adjacent to said pocket, and a securing strap adapted to secure a distal end of said tool, whereby said parallel walls are located between said pocket and said securing strap, and are offset from said open top of said pocket such that said parallel walls and said open top of said pocket are obliquely oriented to said open top of the pocket;
and an interior compartment formed of four walls defining an interior region, a plurality of divider walls dividing said inner region to create a plurality of interior containers, and an interior compartment lid hingedly secured to at least one of said four compartment walls and covering said interior containers.

2. The device of claim 1, wherein said interior compartment lid comprises a pair of draw latches.

3. The device of claim 1, wherein said interior containers utilize three walls of said base member as a boundary.

4. The device of claim 1, wherein said interior containers are removable from within said base.

5. The device of claim 1, wherein said walls of said lid member overhang said upstanding walls of said base member, providing an overlap to prevent water from entering said base member interior space.

6. A vehicle-mounted cargo toolbox, comprising:
a base member having four upstanding walls and a bottom surface, defining a base interior space;
a lid member having four walls and a top surface, defining a lid interior space, and said lid being hingedly secured to said base;
said base having a securing member thereon, said base securing member comprising a pocket secured to said base wherein said pocket comprises one or more side walls, a closed bottom, and an open top, defining an interior volume adapted to retain a working end of a tool, a pair of parallel walls disposed adjacent to said pocket, and a securing strap adapted to secure a distal end of said tool, whereby said parallel walls are located between said pocket and said securing strap and obliquely oriented to said open top of the pocket;
said lid having a securing member thereon, said lid securing member comprising a pocket secured to said lid wherein said pocket comprises one or more side walls, a closed bottom, and an open top, defining an interior volume adapted to retain a working end of a tool, a securing strap disposed adjacent to said pocket that is adapted to retain a portion of said tool, and a bracket adapted to retain a distal end of said tool, whereby said strap is located between said pocket and said bracket;
wherein said open top of said pocket is perpendicular to an opening of said bracket;
a handle disposed along an exterior wall of said lid member, opposite said hinge; a closure securing means attached along an exterior wall of said lid and said base members, opposite said hinge, removably securing said lid to said base;
and an interior compartment formed of four walls defining an interior region, a plurality of divider walls dividing said inner region to create a plurality of interior containers, and an interior compartment lid hingedly secured to at least one of said four compartment walls and covering said interior containers.

7. The device of claim 1, wherein said interior compartment lid comprises a pair of draw latches.

8. The device of claim 1, wherein said interior containers utilize three walls of said base member as a boundary.

9. The device of claim 1, wherein said interior containers are removable from within said base.

10. The device of claim 1, wherein said lid securing member is adapted to retain a fence stretcher tool.

11. The device of claim 1, wherein said walls of said lid member overhang said upstanding walls of said base member, providing an overlap to prevent water from entering said base member interior space.

12. A vehicle-mounted cargo toolbox, comprising:
a base member having four upstanding walls and a bottom surface, defining a base interior space;
a lid member having four walls and a top surface, defining a lid interior space, and said lid being hingedly secured to said base;
a handle disposed along an exterior wall of said lid member, opposite said hinge;
a closure securing means attached along an exterior wall of said lid and said base members, opposite said hinge, removably securing said lid to said base;
said lid having a securing member thereon, said lid securing member comprising a pocket secured to said lid wherein said pocket comprises one or more side walls, a closed bottom, and an open top, defining an interior volume adapted to retain a working end of a tool, a securing strap disposed adjacent to said pocket that is adapted to retain a portion of said tool, and a bracket having only longitudinal openings, said bracket adapted to retain a distal end of said tool, whereby said strap is located between said pocket and said bracket;
wherein said open top of said pocket is perpendicular to said longitudinal openings of said bracket;
and an interior compartment formed of four walls defining an interior region, a plurality of divider walls dividing said inner region to create a plurality of interior containers, and an interior compartment lid hingedly secured to at least one of said four compartment walls and covering said interior containers.

13. The device of claim 12, wherein said interior compartment lid comprises a pair of draw latches.

14. The device of claim 12, wherein said interior containers utilize three walls of said base member as a boundary.

15. The device of claim 12, wherein said interior containers are removable from within said base.

16. The device of claim 12, wherein said lid securing member is to retain a fence stretcher tool.

* * * * *